Oct. 29, 1940. G. T. DOWNEY 2,219,982
VALVE STRUCTURE
Filed Dec. 27, 1938 3 Sheets-Sheet 3
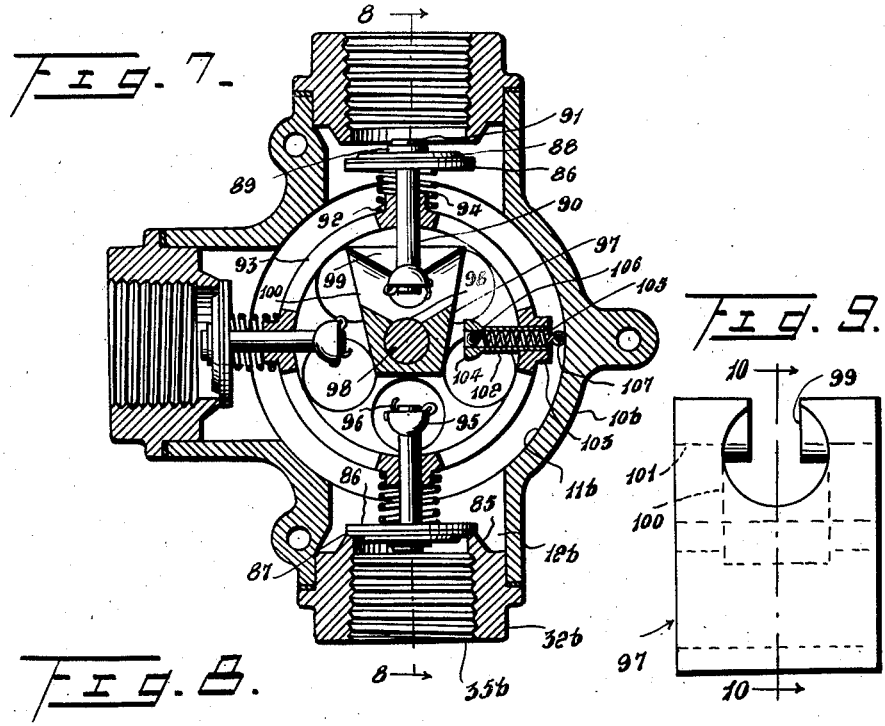
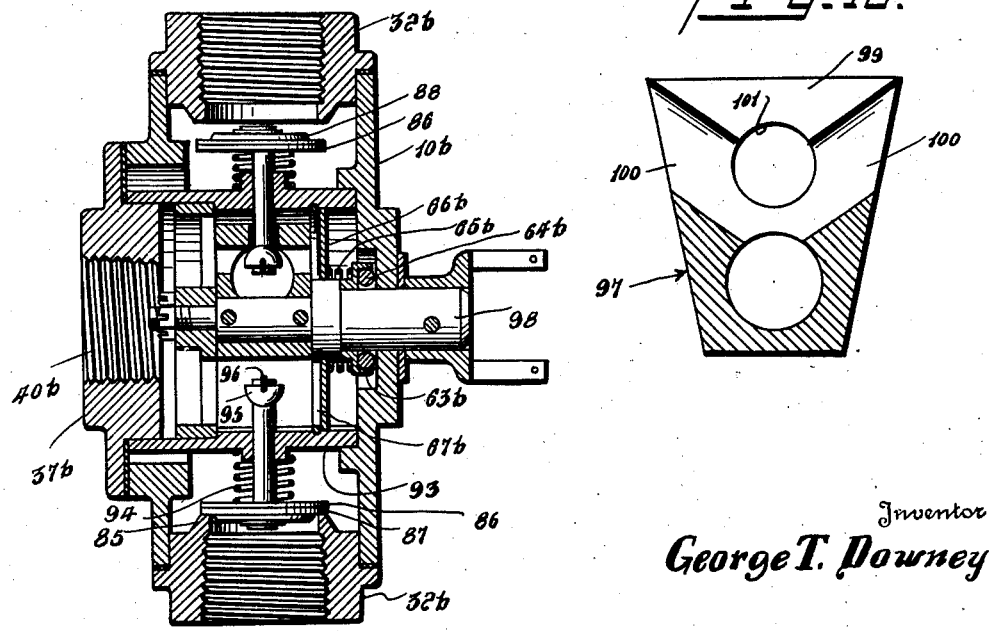
Inventor
George T. Downey
By Kimmel & Crowell
Attorneys Patented Oct. 29, 1940

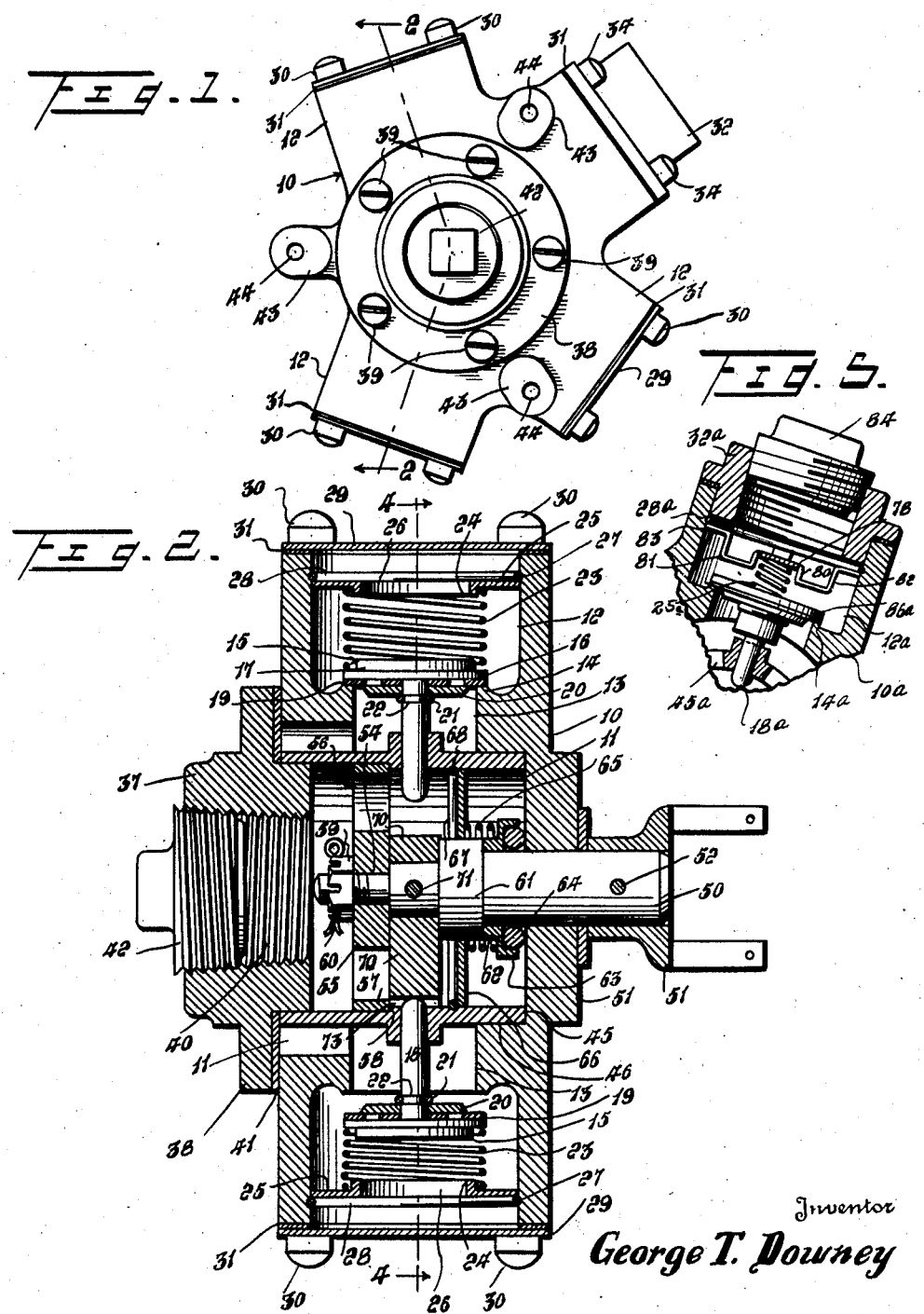

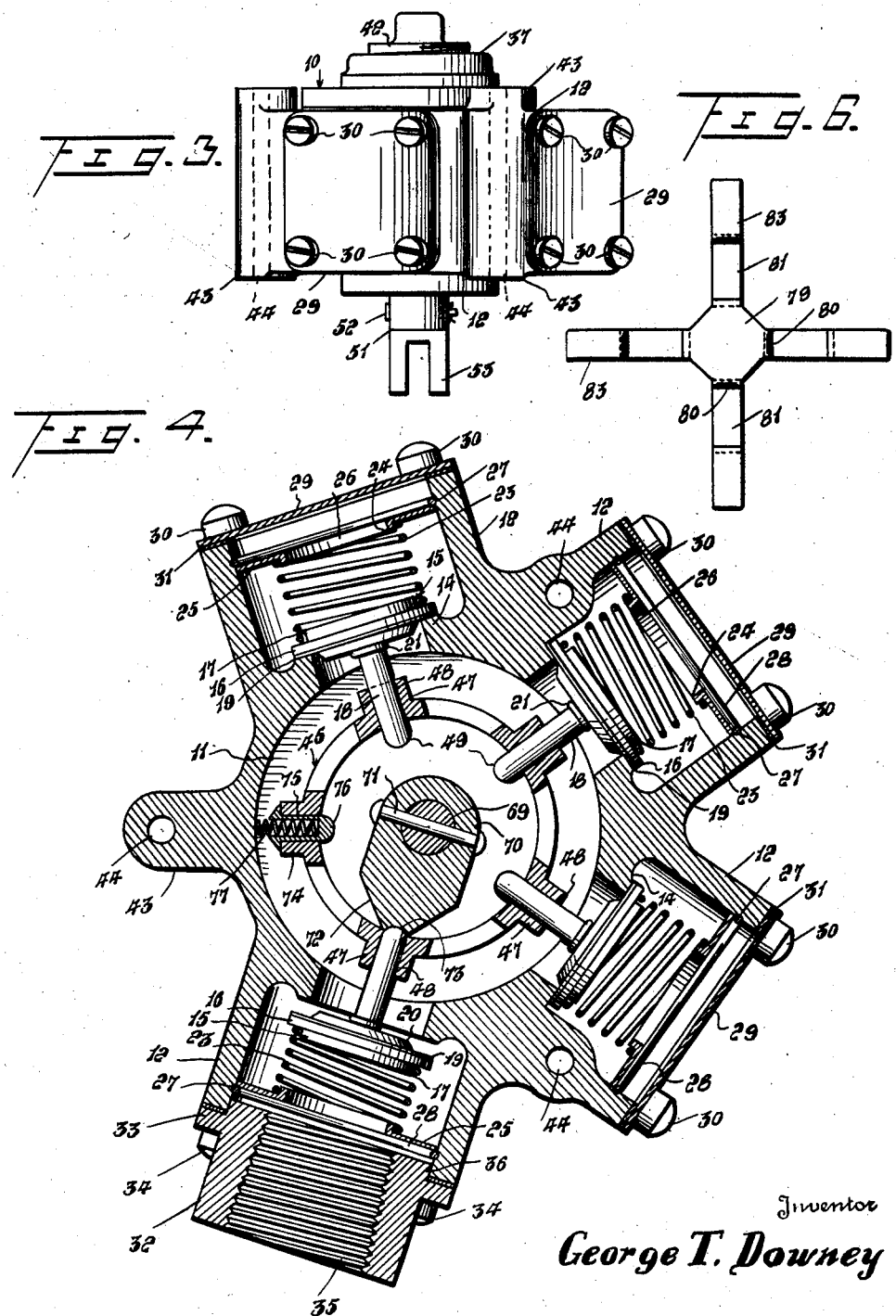

2,219,982

UNITED STATES PATENT OFFICE 2,219,982

VALVE STRUCTURE

George T. Downey, Corry, Pa., assignor to Aero Supply Manufacturing Co., Inc., Corry, Pa.

Application December 27, 1938, Serial No. 247,909

5 Claims. (Cl. 277—20)

The invention relates to valve structures and more particularly to an improved valve structure designed particularly for selectively connecting one of a number of liquid supply sources with a common outlet.

This invention is an improvement over the fuel cock assembly embodied in my copending applications Serial Nos. 216,411 and 216,412, filed June 28, 1938, which eventuated respectively in Letters Patent No. 2,164,232, June 27, 1939, and Letters Patent No. 2,159,845, May 23, 1939.

An object of this invention is to provide an improved valve structure for connecting a plurality of fuel supply tanks or sources with a common fuel outlet so that a selected one of the fuel supply sources may be connected with the fuel outlet.

Another object of this invention is to provide a valve structure of this kind wherein a plurality of tappet valves are adapted to be used, a selected one of the tappet valves being held in open position for connecting a selected fuel source with an outlet which is connected to an internal combustion engine.

A further object of this invention is to provide in a valve structure of this kind an improved means for holding the selected valve in open position, the means eliminating the usual detents which are at present used for selectively holding a valve in open position.

A still further object of this invention is to provide a simplified valve structure wherein the tension on the valves acts as a means for holding the valve operator in operative position relative to the selected valve which is being maintained in an open position.

To the foregoing objects and to others which may hereinafter appear, the invention consists of the novel construction, combination and arrangement of parts as will be more specifically referred to and illustrated in the accompanying drawings, wherein are shown embodiments of the invention, but it is to be understood that changes, variations and modifications may be resorted to which fall within the scope of the invention as claimed.

In the drawings:

Figure 1 is a detail rear elevation of a valve assembly constructed according to an embodiment of this invention, Figure 2 is an enlarged sectional view taken on the line 2—2 of Figure 1, Figure 3 is a detail side elevation of the assembly, Figure 4 is a sectional view taken on the line 4—4 of Figure 2, Figure 5 is a fragmentary sectional view of a modified form of valve structure, Figure 6 is a plan view of a spring seat for the valve shown in Figure 5, Figure 7 is a horizontal view taken through a further modification of the invention, Figure 8 is a sectional view taken on the line 8—8 of Figure 7, Figure 9 is a detail end elevation of the cam operator for the valve disclosed in Figures 7 and 8, and Figure 10 is a sectional view taken on the line 10—10 of Figure 9.

Referring to the drawings, the numeral 10 designates generally a housing which is provided with a centrally disposed fuel or liquid chamber 11. The housing 10 is provided with a plurality of radially disposed intake chambers 12 and a port 13 provides communication between the central chamber 11 and the radial chambers 12. A valve seat 14 is provided at the outer end of the port 13 and a valve member 15 is adapted to engage on the seat 14. The valve member 15 comprises a plate 16 having a reduced outer portion 17 and a stem 18 is secured to the head 16 and projects inwardly through the port 13 in a direction radial of the chamber 11. A gasket 19 is disposed on the under side of the valve plate member 16 and is held in operative position by means of an inner plate 20 which is detachably held in clamping position by means of a ring 21 engaging in a peripheral groove 22 provided in the stem 18. In this manner the gasket 19 may be removed for replacement by opening the ring 21 and removing the plate 20.

The valve member 15 is yieldably held against the seat 14 by means of a spring 23 which at its inner end engages about the reduced portion 17 and at its outer end engages about a flange 24 carried by a plate 25. The plate 25 is provided with a central opening 26 through which the fuel is adapted to pass. The chamber 12 adjacent the outer portion thereof is provided with an inner groove 27 in which a split ring 28 is adapted to releasably engage. The ring 28 bears against the outer side of the plate 25 and holds the plate 25 against outward movement.

The housing 10 may be provided with any desired number of intake chambers 12 with a valve 15 for each chamber and where the housing 10 is provided with more intake chambers 12 than are required a closure plate 29 is adapted to be secured as by bolts or screws 30 to the outer end of the chamber 12. A sealing gasket 31 is interposed between the plate 29 and the outer end of the chamber 12. A connecting member 32 having a flange 33 is secured as by bolts or screws 34 to the desired chambers 12 and the connecting member 32 is provided with interior threads 35 to receive one end of a fuel pipe line or other connection. The connecting member 32 as shown in Figure 4 has a relatively short extension 36 which projects interiorly of the chamber 12. The axis of the connecting member 32 is coplanar with the axis of the opening 26 in the plate 25 so that fuel can pass through the connecting member 32 and then into the chamber 12.

The housing 10 is provided in one side thereof with a detachable outlet member 37 which is provided with a flange 38 secured to the adjacent side of the housing 10 by means of bolts or screws 39. The outlet member 37 is provided with a threaded central opening 40 which is coaxial with the chamber 11. A gasket 41 is interposed between the flange 38 and the adjacent side of the housing 10. As shown in Figure 2, a threaded plug 42 may initially be inserted in the threaded opening 40 of the outlet member 37, but when the valve assembly is in use the plug 42 will be removed and a connecting pipe connecting the outlet member 37 with an internal combustion engine is adapted to be threaded into the outlet member 37. The plug 42 is provided for the purpose of preventing foreign matter from entering the interior of the valve assembly during the shipment and initial mounting of the device in the desired position.

The housing 10 is provided with a plurality of radially disposed bosses 43 having openings 44 through which attaching bolts or the like may be extended for the purpose of attaching the housing 10 on a suitable support. The housing 10 may be mounted in either a horizontal or a vertical position depending only on the character of support to which the housing is attached.

A cage member 45 is disposed within the fuel chamber 11 and the inner end of the cage member 45 seats within an annular seat or reduced portion 46 provided in the chamber 11. The cage member 45 is provided with a plurality of radially disposed bosses 47 having a guide opening 48 therethrough for slidably receiving a valve stem 18. The stem 18 projects entirely through the cage member 45 and the inner end of each stem 18 is provided with a rounded or substantially semi-spherical portion 49. The outer end of the cage member 45 is disposed in contacting relation with the gasket 41 as shown in Figure 2 and preferably, the cage member 45 is slightly smaller in diameter than the diameter of the major portion of the chamber 11 as shown in Figures 2 and 4 so that the liquid passing through the port 13 may freely enter the chamber 11 and then pass out of this chamber through the outlet port 40.

A valve controlling or operating shaft 50 is journalled through a boss 51 carried by one side of a housing 10 and this shaft 50 is adapted to have a handle attaching member 51 secured thereto as by a pin or fastening member 52. In the present instance the handle attaching member 51 is constructed in the form of a pair of parallel arms 53 between which a portion of a handle 70 is adapted to be secured as set forth in my copending applications. The shaft 50 has a reduced portion 54 at its inner end which rotatably engages through a bushing or bearing member 55 carried by a spider 56. The spider 56 is provided with an annular rim 57 engaging within the interior of the cage 45 and the spider 56 abuts against a shoulder 58 provided in the cage 45 at one side of the stems 18 as shown in Figure 2.

The reduced portion 54 of the shaft 50 is provided with threads to receive a holding nut 59 which may be locked by means of a cotter pin 60.

The shaft 50 is provided interiorly of the chamber 11 with a peripheral flange 61 against which the cylindrical portion 62 of a cup-shaped member 63 is adapted to engage. A gasket 64 is interposed between the inner face of the boss 51 and the cup 63 being positioned about the shaft 50. A spring 65 is positioned about the flange or enlarged portion 61 and at its outer end engages against the cup member 63 and at its inner end engages against an apertured abutment plate 66 which encompasses the shaft 50 and bears against the inner face of the cage member 45. The plate 66 is held in the desired position by means of a split ring or holding member 67 engaging in an annular groove 68 provided in the cage member 45. The plate 66 also acts as a means to protect the member 63, gasket 64 and spring 75 from the fluid entering the chamber 11.

The shaft member 50 is provided with a reduced portion 69 on which a cam member 70 is secured as by a pin or fastening member 71. The cam member 70 is provided with a substantially V-shaped cam portion 72 in the peak of which an arcuate groove or recess 73 is positioned. The groove or recess 73 is provided in order to receive the rounded end portion 49 of a stem 18 in order to hold the cam member 70 and the shaft 50 against rotation. The tension of the spring 23 will hold the stem 18 in the recess or groove 73 and thus yieldably hold the shaft 50 against rotation.

The cage member 45 is provided with a boss 74 between a selected pair of bosses 47 in which a cylindrical or a cup-shaped member 75 is slidable. The cup-shaped member 75 is provided with a rounded inner end portion 76 projecting interiorly of the cage 45 and a spring 77 engages within the cup-shaped member 75 and against the adjacent wall of the fuel chamber 11. The cup-shaped member 75 with the head or inner end portion 76 comprises a stop or holding member which is adapted to engage in the recess 73 of the cam 70 for holding the shaft 50 in a position where all of the valves 15 are in a closed position.

In Figure 5 there is disclosed a modified form of valve structure wherein the housing 10a is provided with a fuel port 12a and an outwardly opening valve 16a is adapted to engage a valve seat 14a. The valve member 16a is provided with a valve stem 18a slidable through a cage member 45a and is spring pressed to a closed position by means of a spring 25a. In the present instance, the spring 25a is relatively small in diameter and at its outer end engages in a spring seat member 78 which is constructed in the form of a spider provided with a plate 79 having a plurality of inwardly projecting arms 80 and radially disposed arms 81 project outwardly from the arms 80. Right angularly and outwardly projecting arms 82 are integral with the extensions 81 and terminate in lateral extensions 83 which engage against a holding ring 28a. In this form the fluid is not adapted to pass through the convolutions of the spring as in the construction shown in Figures 2 and 4. A flanged connector 32a is mounted in the port 12a and where a particular port 12a is not in use, a plug 84 is adapted to be connected to the connector 32a. In other respects the valve structure shown in Figure 5 is similar to the construction shown in Figures 2 and 4.

In Figures 7 to 10 inclusive, there is disclosed a housing 10b which is provided with a fluid chamber 11b and a connector 37b is secured to one side of the housing 10b in the same manner as the connector 37. This connector 37b is provided with a port 40b in which a pipe may be mounted and connected to a suitable source of fuel supply or if desired, may be connected to a source of fuel consumption such as an internal combustion engine. The housing 10b is provided with a plurality of radially arranged fuel chambers 12b in which connectors 32b are adapted to be mounted and these connectors are provided with a fuel passage 35b. The inner end of each connector 32b is provided with a valve seat 85 against which a valve member 86 is adapted to engage. The valve member 86 is similar to the valve member 16 with the exception that the gasket 87 is on the outer end of the valve member 86 and the gasket 87 is held against the valve head 86 by means of a plate 88 and a split ring 89. The valve stem 90 in the present instance projects as at 91 outwardly of the head 86 of the valve and the ring 89 is mounted about the projecting end portion 91 of the stem. The stem 90 is slidable through a boss 92 formed on the cage member 93 similar to the cage 45 and a spring 94 engages about the boss 92 and against the inner side of the valve member 86. The spring 94 constantly urges the valve member 86 outwardly to a valve closing position.

The inner end of the valve stem 90 has mounted thereon a semispherical nut or head 95 which may be threaded or otherwise mounted on the stem 90 and held in adjusted position by a cotter pin or lock member 96. A selected valve member 86 is held in open position by means of a valve operating cam generally designated as 97 and which is mounted on an operating shaft 98 journalled in the housing 10b. The cam member 97 is constructed in the form of a truncated pyramid with the smaller end innermost and fixedly secured to the shaft 98. The cam member 97 has a slot 99 through the outer end base portion thereof which is of a width sufficient to permit the stem 90 to move therethrough. The cam member 97 is provided with a pair of inwardly convergent passages 100 which are circular in transverse section and within which the nut 95 is adapted to engage. The rounded portion of the nut 95 is adapted to slide over the outer arcuate surface of a passage 100 and when the nut member 95 is positioned at the convergent end of the V-shaped passage 100, the nut member 95 is adapted to seat on an arcuate seat 101 which is provided at the apex of the passage 100. In this manner the cam 97 will be maintained by the tension of the spring 94 in a valve opening position until the shaft 98 has been turned so as to release the nut 95 from the cam 97.

The cam member 97 is held in a released position by means of a holding member in the form of a sleeve or tubular member 102 which is slidable through a boss 103 formed in the cage 93. The sleeve 102 has a head or cam engaging member 104 on the inner end thereof similar to the configuration of the nut 95 and is adapted to be pulled inwardly against the tension of a spring 105. The spring 105 has its inner end secured to a pin 106 mounted across the inner end of the sleeve 102 and a second pin 107 is mounted through an eye provided in the outer end of the spring 105 and is adapted to engage against the outer end of the boss 103 so that the cam holding member comprising the sleeve 102 and the head 104 will be constantly urged outwardly. The head 104 is adapted to engage against the seat 101 in the cam 97 and yieldably hold the cam 97 against rotation and in released position.

The housing 10b has a plate 66b mounted within the cage 93 which engages against a ring 67b similar to the ring 67. A cup-shaped sealing member 63b is mounted about the shaft 98 and is yieldably urged outwardly by a spring 65b. A gasket 64b is mounted about the shaft 98 and is held in a sealed position by the tension on the cup 63b which is arranged between spring 65.

The valve structure disclosed in Figures 2, 4, 7 and 8 may be used to connect a plurality of fluid supply sources with a common outlet, but if desired the outlet described as 40 or 40b may be connected to a fuel source with the flow of the liquid reversed and the ports 12 and 12b forming outlets which are adapted to be connected to internal combustion engines. Where this is done the common port 40 or 40b may be enlarged sufficiently to compensate for the reverse flow of fluid so that the common intake port will be large enough to maintain the valve chamber 11 or 11b filled at all times.

It will also be understood that where the flow of liquid is reversed and it is desired to connect one or more radial ports with the axial port, the valve operating cam may be enlarged to provide means for operating two or more of the valves at the same time. Where this is done, the position of the cam holding member or stop may be changed from the position in Figures 4 and 7 so that in one position the multiple cam will be maintained in a released position.

In the use and operation of the valve assembly shown in Figures 1 to 6 inclusive, the cam member 70 is turned by means of the shaft 50 to a position similar to that shown in Figure 4 where the inner grounded end 49 of a valve stem 18 is seated in the arcuate seat 73 of the cam 70. The connector 37 may be connected to an internal combustion engine where this connector is used as an outlet and a selected number of intake members or chambers 12 are connected to the several sources of fuel supply. The fuel will flow through the connector 32 and through the opened valve port thence through the cage 45 and out through the outlet port 40. Where the flow of fuel is reversed the fuel will enter through the port 40, pass through the cage 45 and then through the selected radial port 12.

Where the valve structure shown in Figures 7 to 10 inclusive is used, the rotation of the shaft 98 to a valve opening position will cause the cam 97 to pull the selected valve member 86 to an open position as shown in Figures 7 and 8 and in this position the nut 95 will seat on the arcuate seat 101.

The cam member 97 as with the cam member 70 will be held against rotation by the tension of the spring 94. The valve structure shown in Figures 7 to 10 inclusive may be used with the radial ports 12b forming intake ports and the connector 37b forming an outlet which is adapted to be connected to a single internal combustion engine. However, the flow of liquid in this form may also be reversed by connecting the connector 37b to one or more fuel sources and connecting the radial ports 12b to the desired internal combustion engines. Where the engines are operated in pairs or in other multiples, the cam member 97 may be made in the form of a multiple cam which is adapted to maintain one or more of the valve members 86 in an open position at the same time.

The valves hereinbefore described are particularly designed for airplane constructions where a number of fuel tanks are connected to the engines and selected ones of the tanks are operatively connected with the engines so as to drain the fuel from the selected tanks. These valves as hereinbefore stated may also be used for operating a plurality of engines from a common fuel source. This latter procedure may be effected by merely reversing the flow of liquid through the valve structure.

What I claim is:

1. A valve structure comprising a housing provided with a fluid chamber, a plurality of radially arranged intake ports and a common outlet port communicating with said chamber, a valve seat in each of said intake ports, a spring-pressed valve for each seat, an annular cage within said chamber, a one piece continuous stem carried by each valve slidable through said cage, the inner terminal portion of each stem being rounded throughout and positioned interiorly of said cage, a valve operating shaft journaled axially of said cage, a cam member fixed to said shaft and engageable with a selected stem to hold a selected valve in open position, said cam having an arcuate recess in the peak thereof within which the rounded inner terminal portion of a stem is adapted to engage, the selected valve yieldingly holding said shaft against rotation, said shaft having a peripheral flange intermediate its ends, a gasket encompassing said shaft and abutting an end wall of said chamber, a holding member in said chamber about said shaft abutting said gasket and one end of said flange, a spring about said flange and member having one end abutting one end of said member, a circular upstanding axially apertured combined abutment and protecting plate mounted on said flange in coaxial relation having its inner edge snugly engaging the flange and its outer edge snugly engaging the inner face of said cage, said plate abutting the other end of said spring and protecting the latter and the holding member from the fluid entering said chamber, said cage having an annular groove interiorly thereof, and a split ring in said groove engaging said plate to hold said plate against inward movement.

2. A valve structure comprising a housing provided with a plurality of radial fluid ports and a chamber common to all of said ports, said housing also having an axial port communicating with said chamber, a valve seat for each radial port, a spring-pressed poppet valve engageable on a seat, said valve including an inwardly extending stem, a cylindrical cage in said chamber, valve stem guide bosses carried by said cage, a shaft journaled in said housing, an internal bearing for said shaft, means removably engaging in said cage supporting said bearing coaxial of said cage, a cam member carried by said shaft, said cam member being engageable with a selected stem to thereby move a valve to open position, said cam member and said stems including coacting means for yieldably holding the cam against rotation.

3. A valve structure comprising a housing provided with a plurality of radial fluid ports and a chamber common to all of said ports, said housing also having an axial port communicating with said chamber, a valve seat for each radial port, a spring-pressed poppet valve for each seat, an inwardly projecting stem carried by each valve, a cylindrical cage snugly engaging in said fluid chamber, valve stem guides carried by said cage, a shaft rotatably carried by said housing and disposed axially of said cage, a stem engaging cam carried by said shaft, an annulus removably engaging in said cage, a shaft bearing carried by said annulus, and a coupling member for said axial port, said coupling member comprising an annular body snugly engaging within an end of said cage, said body having a threaded axial bore, a flange carried by said body and means detachably securing said flange on said housing.

4. A valve structure comprising a housing provided with a plurality of radial fluid ports and a chamber common to all of said ports, said housing also having an axial port communicating with said chamber, a valve seat for each radial port, a spring-pressed poppet valve for each seat, an inwardly projecting stem carried by each valve, a cylindrical cage snugly engaging in said fluid chamber, valve stem guides carried by said cage, a shaft rotatably carried by said housing and disposed axially of said cage, a stem engaging cam carried by said shaft, an annulus removably engaging in said cage, a shaft bearing carried by said annulus, a coupling member for said axial port, said coupling member comprising an annular body snugly engaging within an end of said cage, said body having a threaded axial bore, a flange carried by said body and means detachably securing said flange on said housing, a coupling member for each radial port comprising an annular internally threaded body snugly engaging in a radial port, a flange carried by each of said latter bodies and threaded means detachably securing said latter flanges on the outer end of a radial port.

5. A valve structure comprising a housing provided with a plurality of radial fluid ports and a chamber common to all of said ports, said housing also having an axial port communicating with said chamber, a valve seat for each radial port, a spring-pressed poppet valve engageable on a seat, said valve including an inwardly extending stem, a cylindrical cage in said chamber, valve stem guide bosses carried by said cage, a shaft journalled in said housing, an internal bearing for said shaft, an annular shoulder formed in said cage inwardly of an end thereof, an annulus secured to said bearing and engaging within said cage against said shoulder for supporting said bearing coaxial of said cage, a cam member carried by said shaft, said cam member being engageable with a selected stem to thereby move a valve to open position, said cam member and said stems including coacting means for yieldably holding the cam against rotation.

GEORGE T. DOWNEY.